May 30, 1950  R. A. M. BARBEY  2,509,718
ELECTRIC CALCULATOR FOR STUDYING CORRELATIVE VARIATIONS OF
QUANTITIES INTERCONNECTED BY A SYSTEM OF MATHEMATICAL
RELATIONS FORMING A DOUBLE ENTRY CHART
Filed July 13, 1945
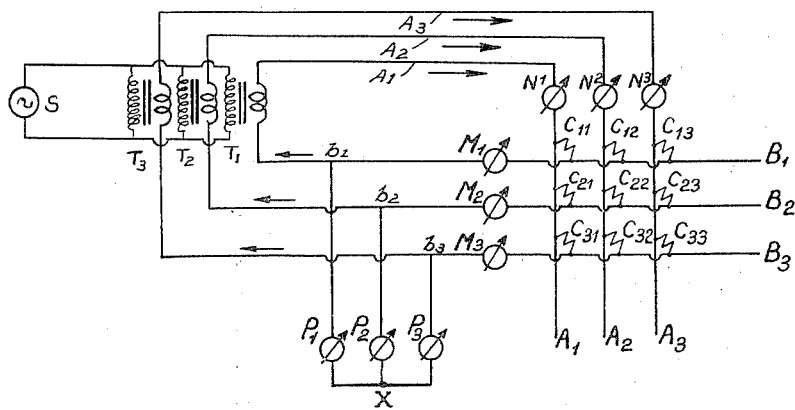
INVENTOR
Raymond Alphonse Marie Barbey
By (signature)
his ATTY.

Patented May 30, 1950

2,509,718

UNITED STATES PATENT OFFICE 2,509,718

ELECTRIC CALCULATOR FOR STUDYING CORRELATIVE VARIATIONS OF QUANTITIES INTERCONNECTED BY A SYSTEM OF MATHEMATICAL RELATIONS FORMING A DOUBLE ENTRY CHART

Raymond Alphonse Marie Barbey, Paris, France

Application July 13, 1945, Serial No. 604,910
In France September 18, 1944

3 Claims. (Cl. 235—61)

Some bookkeeping, industrial, technical, economical, sociological and like problems consist in studying correlative variations of certain values or quantities interconnected by a system of mathematical relations forming a double entry chart.

In order to clearly understand the objects and purposes of this invention, I shall refer by way of example to the study of economical exchanges within a State and, for the sake of simplicity, I assume that the economist is merely interested with the following four branches of activity: Government or State, Transports and Credit, Agriculture, and Industry. According to the method of G. Ed. Guillaume (Manuel du Comité de l'Heure, published by the "Centre d'Analyse Economique," Paris, 9 Rue Lincoln, 1942) the quantities or values may be arranged in the following double entry table:

|  | State | Transports and Credit | Agriculture | Industry | Totals | Profits and Losses |
|---|---|---|---|---|---|---|
| State | $Q_{11}$ | $Q_{12}$ | $Q_{13}$ | $Q_{14}$ | $M_1$ | $P_1$ |
| Transports and Credit | $Q_{21}$ | $Q_{22}$ | $Q_{23}$ | $Q_{24}$ | $M_2$ | $P_2$ |
| Agriculture | $Q_{31}$ | $Q_{32}$ | $Q_{33}$ | $Q_{34}$ | $M_3$ | $P_3$ |
| Industry | $Q_{41}$ | $Q_{42}$ | $Q_{43}$ | $Q_{44}$ | $M_4$ | $P_4$ |
| Totals | $N_1$ | $N_2$ | $N_3$ | $N_4$ |  |  |

At the crossing points of the checkerwork, quantities $Q_{11}$, $Q_{12}$, ... $Q_{21}$; $Q_{22}$ ... etc. represent, in convenient units, the exchanges between the various groups, and the horizontal lines represent receipts or entries and the vertical lines expenditures or outlays.

Thus, $Q_{11}$, considered horizontally, represents the receipts of the State at the expense of its own organisms (taxes), the revenue from its own domains, etc. $Q_{12}$ represents the taxes received by the State from the branch: Transports and Credit, $Q_{13}$ the taxes received from the branch: Agriculture, etc.

Similarly, $Q_{21}$ represents the receipts of the group "Transports and Credit" at the expense of the group "State" (State Budget, participations in the deficit of railways, subsidies, commissions due to Banks, interests on loans, etc.). $Q_{22}$ represents the receipts of the group "Transports and Credit" at the expense of its own organisms (expenses in the form of transportation cost of the labour employed in transports and in banks, profits of the credit establishments at the expense of this labour, etc.). $Q_{23}$ represents the receipts of the same group at the expense of Agriculture, etc.

It is readily visible that the totals $M_1$ $M_2$ $M_3$ $M_4$ of the horizontal lines and the totals $N_1$ $N_2$ $N_3$ $N_4$ of the vertical lines differ respectively from each other by a positive or negative quantity $P_1$ $P_2$ $P_3$ $P_4$, which represents the profits or losses of any one of the groups under consideration.

These quantities are therefore connected by the following system of relations:

$Q_{11}+Q_{12}+Q_{13}+Q_{14}+P_1=M_1+P_1=$
$\qquad Q_{11}+Q_{21}+Q_{31}+Q_{41}=N_1$
$Q_{21}+Q_{22}+Q_{23}+Q_{24}+P_2=M_2+P_2=$
$\qquad Q_{12}+Q_{22}+Q_{32}+Q_{42}=N_2$ and so on.

The establishment of such a table from statistical data calls for a critical examination of the latter. It is scarcely probable that the values initially attributed to $Q_{11}$, $Q_{12}$, $Q_{13}$ etc. would satisfy the aforesaid relations, while translating a true or likely image of the reality. The economist is therefore led to adjust the figures by successive approximations, until the quantities finally adopted will be satisfactory and are consistent with the information gathered from other sources.

With a table having four lines and four columns, as the diagrammatical one above outlined, these operations do not offer special difficulties. However, with a table comprising several tens, hundreds and even thousands of lines and columns, the examination of the response on the whole of the adjustment of a single figure, and more especially of the correlative adjustment of several figures (most frequent case) leads to extremely long calculations. The operation, therefore, cannot be effected within an acceptable time, even when performed by well trained and experienced calculators using calculating machines.

On the other hand, supposing that the table has been satisfactorily figured and adequately represents the economic situation of a State at a certain date for example, economical, political, diplomatical, military, meteorological, seismical and other events, technical revolutions, etc. cause the above quantities to vary continuously. Instantaneous readjustment of the table therefore calls for the combined study of correlative variations of these quantities, hence calculations liable to be much more complicated as the number of studied quantities is greater.

The above selected example belongs to the domain of economics. But this method of study is also valuable for the study of exchanges within an industrial trust, manufacturing plant and the like. In the technical field, problems of the same nature arise for example in the interconnections of a network for the distribution of electric energy. The units may therefore be of very different kinds (monetary, numerical, ponderal units, units of volume, units of quantities of energy, etc.), provided, of course, that they are homogeneous and additionable.

The invention has for its object to device an electrical apparatus permitting to instantaneously and continuously compute correlative variations of the quantities $Q_{11}$, $Q_{12}$ ... $M_1$, $M_2$ ... $N_1$, $N_2$ ... $P_1$, $P_2$ ..., when one or several of them are adjusted or undergo a variation.

The invention has further for its object to devise an electric integrator adapted to integrate variations of these quantities in function of the time, so as to totalize the exchanges between the groups as well as the profits or losses of any one of these groups.

The machine designed according to the invention substantially comprises:

(a) Two series of $n$ electro-conductors corresponding respectively to the horizontal and vertical lines of a checkerwork, each one of these conductors being provided with a measuring instrument for the current flowing therethrough;

(b) A series of $n$ sources of electric current of uniform tension for all of these sources, the terminals of each one of these sources being connected respectively with a conductor of each series;

(c) A series of $n$ conductors for balancing the tensions of one of the series, said conductors being connected to a neutral point and being respectively provided with instruments for measuring the currents of circulation;

(d) Adjustable resistances between each conductor of a series and all conductors of the other series, corresponding to the crossing points of the checkerwork;

The arrangement being such that the three series of measuring instruments continuously and instantaneously record the currents circulating on the one hand in the two series of conductors of the checkerwork, that is to say the totals (M, N), and on the other hand in the balancing conductors, that is to say the differences $P=(M-N)$ and hence the variations of these quantities in function of those represented by the adjustable resistances.

The invention thus broadly consists in translating the quantities to be studies into electric currents, the characteristics of which are proportional to these quantities, and to carry out a wiring diagram translating the algebraic relations between these quantities.

The quantities $Q_{11}$, $Q_{12}$ ... $Q_{21}$, $Q_{22}$ ... in particular, are translated by means of a system of proportional conductances, that is to say resistances inversely proportional to the quantities to be studied, namely the adjustable resistances above referred to.

When the measuring instruments are instantaneous indicators (for example ammeters) the reading will give the instantaneous value of the studied quantities (M N P). When these instruments are totalizing meters, the reading will give the value of these quantities integrated in function of the time.

This latter arangement provides for bookkeeping or statistical studies of quantities which continuously vary during a certain operative period or other selected time interval.

The invention will be better understood with reference to the accompanying drawing, which shows, by way of example, an embodiment of the invention, corresponding, for the sake of simplicity, to a double entry table with three lines and columns.

In the drawing, the system of quantities $Q_{11}$, ... $Q_{12}$ ... $Q_{21}$, $Q_{22}$ ... is translated into a system of conductances $C_{11}$ ... $C_{12}$ ... $C_{21}$, $C_{22}$ ... proportional (or, in other terms, a system of resistances inversely proportional) to the quantities to be materialized. These conductances or resistances are associated with a network constituted by two series of conductors $A_1$ $A_2$ $A_3$ ... $B_1$ $B_2$ $B_3$ so arranged as to electrically translate the algebraic relations of the double entry table.

Each conductance C is connected with a line of vertical "flux" A and with a line of horizontal "flux" B, respectively. This conductance thus contributes in computing the respective totals of these two perpendicular lines. $T_1$, $T_2$, $T_3$ denote transformers whose secondary windings are respectively connected with one line A and one line B, while the primary windings are fed in parallel by an electrical source S of uniform tension U. The measuring instruments $M_1$ $M_2$ $M_3$, $N_1$ $N_2$ $N_3$, $P_1$ $P_2$ $P_3$ may be ammeters or totalizing meters. Thus, the instruments M measure the following currents:

For $M_1: U\ (C_{11}+C_{12}+C_{13})$
For $M_2: U\ (C_{21}+C_{22}+C_{23})$ and so on.

These readings are therefore proportional to the totals of the quantities $Q_{11}$, $Q_{12}$, $Q_{13}$ etc., counted horizontally, following the lines of the table.

Similarly, the instruments N give readings proportional to the total of the quantities Q ..., counted vertically, following the columns of the table.

As the vertical and horizontal totals are not necessarily equal, the positive or negative differences $P_1$ $P_2$ $P_3$ ...—the algebraic sum of which is by the way always zero $(P_1+P_2+P_3=0)$—are read on the ammeters $P_1$ $P_2$ $P_3$ ..., respectively, mounted on balancing conductors respectively connected to the elementary conductors $B_1$, $B_2$, $B_3$ of one series at points $b_1$, $b_2$, $b_3$.

The neutral point X of the balancing conductors assures a constant tension on the return circuit.

If, in the economical or technical problem studied, some quantities Q are constant data, while others are variable, the conductances corresponding to the first-mentioned quantities will be kept constant and the others will be varied, the variations of the various totals or differences being read on the ammeters. Conversely, it is possible to vary some quantities considered as variable factors, with a view to obtaining certain predetermined totals or annulling certain differences.

Under all circumstances, by the very properties of the "electric checkerwork," the values imparted to the conductances and the readings on the measuring instruments will form a perpetually consistent system of variable quantities interconnected according to the system of relations under consideration. The instantaneousness of the result, and its continuous variation, in response to variations of the known quantities with a view to computing unknown quantities, constitute the two essential advantages of the electric translation of the double entry chart which is the essential feature of the present invention.

The use of electric totalizing meters, instead of ammeters, provides for the integration in function of the time of the variation of the quantities Q and for the bookkeeping or statistical operations covering all variations occurring during a selected operative period.

It will be understood that the invention is not limited to the particular embodiments described and shown, which have been set forth merely by way of example.

Having now described my invention, what I claim as new and desire to secure by Letters Patent is:

1. An electric calculator for studying the correlative variations of quantities interconnected by a system of mathematical relations forming a double entry chart, comprising in combination two series of $n$ electric elementary conductors corresponding, respectively, to horizontal and vertical lines of the chart, a measuring instrument provided on each elementary conductor for measuring the intensity of the current flowing therethrough, a series of $n$ sources of electric current of uniform tension, the terminals of each source being connected with an elementary conductor of each series, respectively, a series of $n$ balancing conductors connected to a neutral point and to the respective elementary conductors of one series, for balancing the tensions thereon, a measuring instrument on each of said balancing conductors for measuring the intensity of the current of circulation therethrough and adjustable resistances between each elementary conductor of one series and all elementary conductors of the other series, whereby each of the first mentioned measuring instruments continuously records the sum of the currents circulating in the corresponding elementary conductor, while each of the second mentioned measuring instruments continuously records the current of circulation in the corresponding balancing conductor, representing the differences between the readings of the measuring instruments inserted in the elementary conductors which are directly connected with the balancing conductor under consideration.

2. An electric calculator as claimed in claim 1, wherein said measuring instruments are adapted to measure the instantaneous current at any given instant.

3. An electric calculator as claimed in claim 1, wherein said instruments are adapted to totalize the amount of electric energy over a predetermined interval of time.

RAYMOND ALPHONSE MARIE BARBEY.

REFERENCES CITED

The following references are of record in the file of this patent:

UNITED STATES PATENTS

| Number | Name | Date |
|---|---|---|
| 1,893,009 | Ward | Jan. 3, 1933 |
| 2,323,588 | Enns | July 6, 1943 |
| 2,319,106 | Blackburn | May 11, 1943 |